Patented Mar. 14, 1933

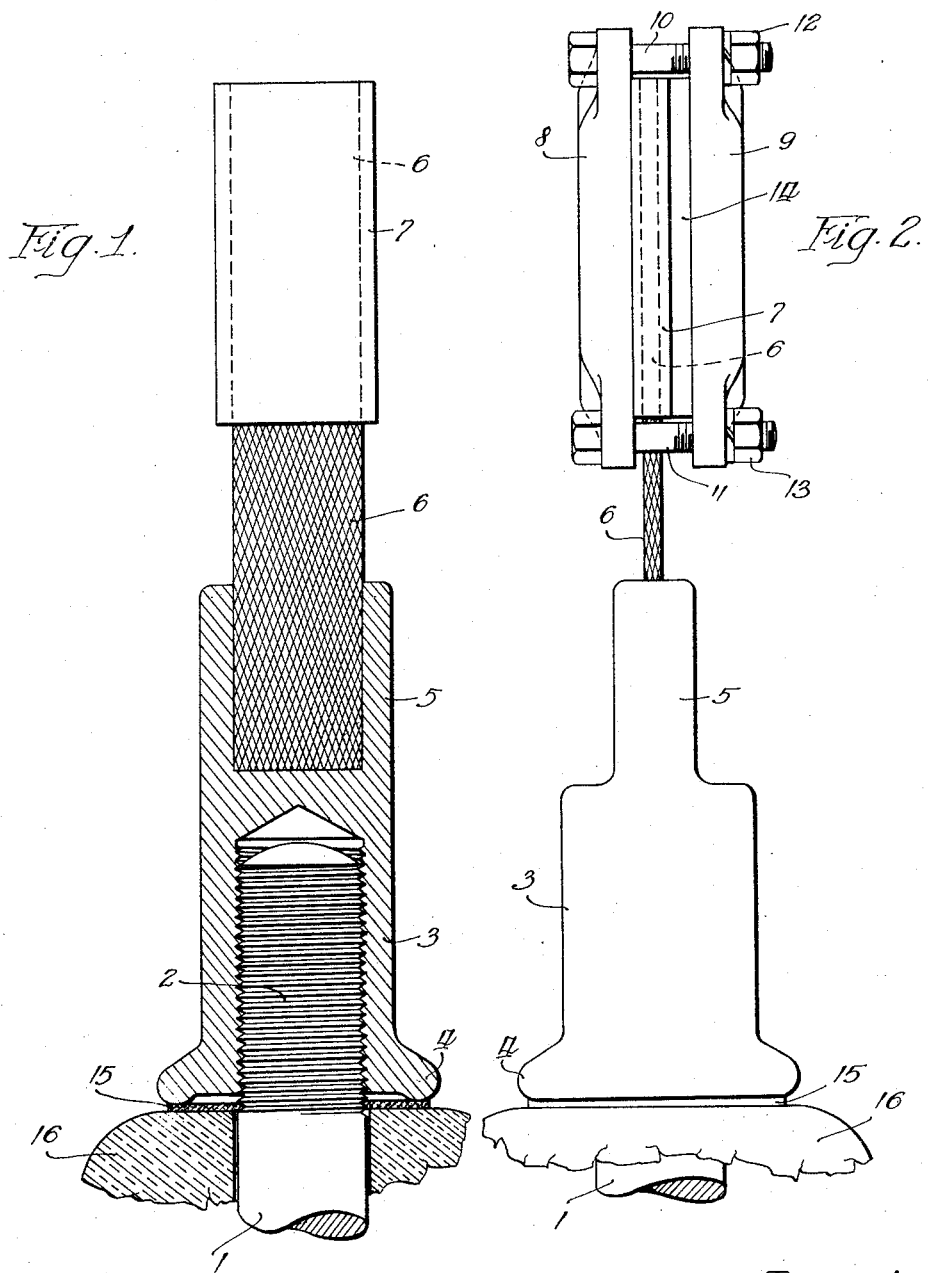

1,901,665

UNITED STATES PATENT OFFICE

JOSEPH RAH, OF CHICAGO, ILLINOIS, ASSIGNOR TO THE DELTA-STAR ELECTRIC COMPANY, OF CHICAGO, ILLINOIS, A CORPORATION OF ILLINOIS

FLEXIBLE CONNECTER FOR CABLE TERMINATORS

Application filed January 22, 1930. Serial No. 422,535.

This invention relates to connecting joints for the transmission of electric current between rigid current conducting members and is particularly concerned with a flexible connecter for cable terminators.

The term cable terminator as used in this specification, designates the terminal assembly for a cable terminating at a certain point, sometimes also referred to as an end-bell or pot-head. It consists in one embodiment of an oil-tight insulating casing containing the end of the terminating cable, and has terminal provisions in conductive relation with the conductor of the cable, for joining the conductor to a stationary bus bar or to another current-conducting or distributing body.

Various provisions are known for accomplishing the desired result. The most commonly known connecting joint for the purpose indicated consists of a rigid stud or rod rigidly projecting from the cap of the cable terminator, which is attached to the bus bar by means of a suitable clamp. It will be understood that fitting is required in almost every case in order to bring the cable terminator in proper alignment with the bus bar. This fitting involves bending and twisting of the cable, subjecting the cable and the insulating body of the cable terminator to strains and resulting frequently in stresses detrimental to the equipment. Breakage of the terminator insulating casing may result, or leakage may be caused due to cracks produced in the assembly by the fitting process, necessitating readjustment and repair. The process of fitting is also time-consuming and, to a certain degree, increases the cost of installation and maintenance.

It is the purpose and the primary object of the present invention to provide a flexible connecter for cable terminators which avoids the disadvantages mentioned above, and furnishes a device which will prove dependable and efficient in installation as well as in operation and maintenance, and which will increase the general utility and reliability of the equipment. The flexible connecter disclosed in this specification is particularly adaptable for use in cases in which the bus bar is mounted adjacent but out of register with the terminator.

When using a rigid terminal in one of these cases, fitting must take place with the object of aligning the rigid terminal, rigidly attached to the terminator, with the bus bar so as to make the clamp connection between the bus bar and the projecting rigid terminal possible.

By using the flexible connecter disclosed and described in the following, no fitting is required, due to a flexible joint projecting from the cap assembly of the terminator, and permitting lateral displacement, and to some extent, also, radial displacement of that part of the terminator which is to be connected to the bus bar.

Another object of the invention relates to utilizing as a terminal that part of the terminator assembly which is also provided for sealing the terminator oil-tight.

My invention provides a solution of the problem of joining a rigid round stud such as is commonly employed to lead a conductor through or from a bushing etc., to a flat bus bar and particularly useful where a slight motion of one or both parts is likely to occur.

Other objects have to do with the general design of the device with a view of increasing its utility and efficiency by structural simplicity.

The invention will now be described in detail with reference to the attached single sheet of drawing, in which Figure 1 represents a front elevation partly shown in cross section; and Figure 2 illustrates a side view of the device with additional clamp equipment shown for the sake of completeness. Identical parts in the drawings are indicated by like reference numerals.

Referring now to the drawing, reference numeral 1 designates the upper portion of a stud member directly connected to the conductor of the terminating cable enclosed within the terminator casing 16. This member is provided with a thread 2 for receiving an internally threaded cast stud or collar member 3, which has a radially projecting shoulder 4 for the purpose of engaging the insulating casing 16 and for sealing the terminal assembly oil tight when the collar member 3 is attached to the member 1. A washer or gasket 15 is interposed between the collar member and the insulating body 16 of the terminator assembly as indicated. The upper portion 5 or member 3 is preferably of the shape shown in the drawing and provided with an opening for receiving one end of a flexible copper or bronze braid 6 which is rigidly attached thereto and embedded therein as shown. A terminal comprising sheath 7 is provided on the upper end of the flexible braid conductor, which may be used for attaching this end of the flexible braid to a bus bar or to other current conducting bodies by means of a simple sectional clamp arrangement, such for example as the one indicated in Figure 2, and consisting of clamping plates 8 and 9 held together by bolts 10 and 11 and nuts 12 and 13. The ends of the terminal sheath 7 are flat, as may be seen from Figures 1 and 2, in order to facilitate clamping of the terminal to the bus bar. Numeral 14 designates the bus bar.

It will be seen from the foregoing that the present invention furnishes an efficient and in every way satisfactory joint between a cable terminator and a bus bar, which will be particularly satisfactory in cases in which lateral fitting might be required due to the location of the bus bar. Undue strains and stresses detrimental to the equipment and caused by such fitting will be largely avoided by using the flexible connecter disclosed in this specification.

It is, of course, understood that modifications of the invention are possible and might readily suggest themselves, and that it is neither desired nor intended to limit the invention to the precise structure as shown and described, but only to the scope of the claim which follows.

What is claimed is:

The combination with a cable terminator having a stud member extending therefrom and constituting the conducting terminus of a cable, means for establishing an electrical connection between said stud member and a bus bar, said means comprising a cooperating conducting member adapted to be secured to the stud in firm electrical engagement therewith, a flexible braided conductor secured at one end to the conducting member, and a terminal secured to the opposite end of the flexible conductor, said terminal being flat on its opposite sides, said sides constituting clamping surfaces to facilitate clamping of the terminal to a bus bar, the flexible conductor comprising the sole mechanical connection between the conducting member and the terminal thereby permitting complete freedom of movement of the terminal with respect to the conducting member within the limits of the length of the flexible conductor.

In witness whereof, I hereunto subscribe my name this 20th day of January, 1930.

JOSEPH RAH.